(12) United States Patent
Schmider

(10) Patent No.: US 10,597,482 B2
(45) Date of Patent: Mar. 24, 2020

(54) TWO-STAGE METHOD FOR PRODUCING A POLYURETHANE HOT-MELT ADHESIVE WITH A LOW CONTENT OF MONOMERIC DIISOCYANATE AND A HIGH INITIAL STRENGTH

(71) Applicant: SIKA TECHNOLOGY AG, Baar (CH)

(72) Inventor: Martin Schmider, Hamburg (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/567,336

(22) PCT Filed: Apr. 19, 2016

(86) PCT No.: PCT/EP2016/058669
§ 371 (c)(1),
(2) Date: Oct. 17, 2017

(87) PCT Pub. No.: WO2016/173892
PCT Pub. Date: Nov. 3, 2016

(65) Prior Publication Data
US 2018/0118871 A1 May 3, 2018

(30) Foreign Application Priority Data
Apr. 28, 2015 (EP) .................................. 15165512

(51) Int. Cl.
| | | |
|---|---|---|
| *C08G 18/10* | (2006.01) | |
| *C08G 18/48* | (2006.01) | |
| *C08G 18/76* | (2006.01) | |
| *C09J 175/08* | (2006.01) | |
| *C08L 33/12* | (2006.01) | |
| *C08G 18/42* | (2006.01) | |
| *B29C 65/48* | (2006.01) | |

(52) U.S. Cl.
CPC ............. *C08G 18/10* (2013.01); *C08G 18/42* (2013.01); *C08G 18/4825* (2013.01); *C08G 18/7671* (2013.01); *C08L 33/12* (2013.01); *C09J 175/08* (2013.01); *B29C 65/483* (2013.01); *C08G 2170/20* (2013.01)

(58) Field of Classification Search
CPC .... C08G 18/10; C08G 18/42; C08G 18/7671; C08G 18/4825; C08G 2170/20; C08L 33/12; C09J 175/00; C09J 175/06; C09J 175/08; C09J 175/10; C09J 175/12; C09J 175/14; C09J 175/16; B29C 65/483
See application file for complete search history.

(56) References Cited

U.S. PATENT DOCUMENTS

| 6,133,415 | A | 10/2000 | Markley et al. | |
|---|---|---|---|---|
| 7,129,312 | B1* | 10/2006 | Krebs | C08G 18/10 528/59 |
| 2004/0162385 | A1 | 8/2004 | Krebs | |
| 2005/0020706 | A1 | 1/2005 | Kollbach et al. | |
| 2006/0084755 | A1* | 4/2006 | Good | C08G 18/4063 524/589 |
| 2008/0306176 | A1* | 12/2008 | Nefzger | C08G 18/10 521/157 |
| 2010/0324254 | A1* | 12/2010 | Saiki | C08G 18/10 528/66 |
| 2013/0190461 | A1 | 7/2013 | Krebs et al. | |

FOREIGN PATENT DOCUMENTS

| DE | 44 29 679 A1 | 2/1996 |
|---|---|---|
| DE | 196 16 046 A1 | 11/1997 |
| EP | 0 337 898 A1 | 10/1989 |
| WO | 01/1443 A1 | 3/2001 |
| WO | 01/40340 A2 | 6/2001 |
| WO | 01/40342 A1 | 6/2001 |
| WO | 03/006521 A1 | 1/2003 |
| WO | 03/033562 A1 | 4/2003 |
| WO | 03/051951 A1 | 6/2003 |
| WO | 03/055929 A1 | 7/2003 |
| WO | 2007/036575 A1 | 4/2007 |
| WO | 2012/041718 A1 | 4/2012 |

OTHER PUBLICATIONS

Jun. 29, 2016 International Search Report issued in International Patent Application No. PCT/EP2016/058669.
Oct. 31, 2017 International Preliminary Report on Patentability issued in International Patent Application No. PCT/EP2016/058669.

* cited by examiner

*Primary Examiner* — Christopher M Rodd
(74) *Attorney, Agent, or Firm* — Oliff PLC

(57) ABSTRACT

A two-stage method for producing a polyurethane hot-melt adhesive, having the stages of A) reacting at least one polyol with at least one diisocyanate, the NCO/OH ratio being greater than 1.5, in order to obtain a reaction mixture containing an isocyanate-functional polyurethane prepolymer and non-converted diisocyanate and B) reacting the reaction mixture obtained in stage A), the mixture containing the isocyanate-functional polyurethane prepolymer and non-converted diisocyanate, with at least one polyester polyol, the NCO/OH ratio being greater than 3. The obtained hot-melt adhesive can be formulated as an R-40 classification-free and storage- and processing-stable PUR-RHM with a residual monomer content below 1 wt. % and has a good initial strength.

11 Claims, No Drawings

TWO-STAGE METHOD FOR PRODUCING A POLYURETHANE HOT-MELT ADHESIVE WITH A LOW CONTENT OF MONOMERIC DIISOCYANATE AND A HIGH INITIAL STRENGTH

TECHNICAL FIELD

The invention relates to the field of hotmelt polyurethane reactives (HMPUR).

RELATED ART

Reactive polyurethane compositions useful as hotmelt adhesives, or hotmelts, are known ("HMPUR"). They usually consist of isocyanate-terminated polyurethane prepolymers obtained by reacting suitable polyols with an excess of diisocyanates. Adhesives of this type develop a high initial adhesive strength immediately they are applied and cool down and acquire their final properties, especially heat resistance and resistance to environmental influences, in the course of the gradually proceeding "cure", i.e., the chemical reaction of the isocyanate groups with atmospheric humidity.

Owing to their molar mass distribution, resulting from the prepolymerization reaction, such HMPURs contain significant amounts of unconverted monomeric diisocyanates ("monomers") which, at the 85 to 200° C., typically 120 to 160° C., application temperatures customary for hotmelts outgas to adversely impact processor health as irritating, sensitizing or toxic substances.

Legislation in the EU requires products to be labelled as harmful (Xn) when their monomer content exceeds the 0.1 wt % limit. Further, at a >1% concentration for monomeric MDI, these products have to be labeled with an additional R-phrase: R-40—limited evidence of a carcinogenic effect. Various efforts have accordingly been made to reduce the monomer content of HMPURs.

An obvious approach is to physically remove the monomer by distillation or extraction, as described, for example in WO 01/14443 A1 and WO 01/40340 A2 (distillation) and also U.S. Pat. No. 6,133,415, DE 19616046 A1 and EP 0337898 A1 (extraction). These methods are technically burdensome and hence costly; nor are they efficiently employable for all monomers.

Another approach consists in using specific diisocyanates having differingly reactive isocyanate groups, as described for example in WO 03/033562 A1, WO 03/006521 A1 and WO 03/055929 A1. Especially the use of an asymmetrical MDI isomer, 2,4'-diphenylmethane diisocyanate, is described as a simple way to obtain prepolymers having a low monomer content coupled with low viscosity. The disadvantage with this method is the insufficient availability of suitable monomers on an industrial scale, coupled with a high price. It is additionally necessary to accept sacrifices in the rate of cure, since primarily only the less reactive isocyanate groups will be left over for the curing reaction.

A final approach is to carry out the prepolymerization using diisocyanate adducts or oligomers instead of monomers as a way to reduce volatility, as described for example in WO 01/40342 A1 and DE 4429679 A1. This results in disadvantages for the viscosity and reactivity of the products thus obtained.

The use of latent curatives such as, for example, SikaHärter® LG, is described in WO 2007/036575 A1. This technology does make it possible to formulate HMPURs which are stable in storage and do not require obligatory labeling. Disadvantages with this approach emerge in the emission behavior (VDA 278). The products thus formulated cannot be employed for automotive applications by reason of high VOC and FOG emissions, since they greatly exceed the limits.

It is known to use silanes, for example mercaptosilanes. This technology does make it possible to formulate HMPURs that are R-40 free or do not require obligatory labeling. Disadvantages with this approach emerge in the emission behavior (VDA 277) due to the methanol evolved in the curing reaction as a condensation product. A further disadvantage is that the silane chemistry proceeds far slower at low temperatures and atmospheric humidities as compared with the NCO-water curing reaction. This leads to immense disadvantages in automotive assembly applications because such adhesive bonds are required to pass cyclical exposure tests after a relatively short cure.

It is known to use stripped prepolymers, for example Desmodur® VPLS 2397. An HMPUR based thereon exhibits the following disadvantages: reduced thermal stability and insufficient storage stability and also lower adherence.

A hotmelt polyurethane reactive (HMPUR) composition based on isocyanate-terminated prepolymers and obtained in a simple method from polyols and industrially available monomeric diisocyanates and which has a low level of precisely these monomers, is stable in storage and readily processable and has lower emissions as compared with the abovementioned approaches, and also displays a high rate of through-cure at low temperatures and atmospheric humidities has not been disclosed to date.

WO 2012/041718 A1 relates to a reactive hotmelt adhesive comprising a prepolymer having two or more isocyanate groups, a low monomer content and a thermoplastic polyester, wherein the prepolymer contains less than 1% of monomeric diisocyanate and is prepared by reacting polyether polyols and/or polyester polyols with a molar excess of diisocyanates.

WO 03/051951 A1 relates to a method of preparing polyurethane prepolymers which comprises a first stage of reacting an asymmetrical diisocyanate with a polyol in an NCO/OH ratio of 1.2:1 to 4:1 and a second stage of adding a further polyol. The prepolymer is useful for forming hotmelt adhesives.

US 2010/324254 A1 describes a reactive hotmelt adhesive obtainable by reacting a polyether polyol with a polyisocyanate and then reacting the reaction product with two polyester polyols.

SUMMARY OF THE INVENTION

The problem addressed by the present invention is therefore that of providing polyurethane hotmelts that overcome the abovementioned disadvantages of the related art. The problem is more particularly that of providing a hotmelt adhesive based on a hotmelt polyurethane reactive (HMPUR) composition where the isocyanate-terminated prepolymer is obtainable in a simple method from polyols and industrially available monomeric diisocyanates. The hotmelt adhesive shall nonetheless display a low monomeric diisocyanate content coupled with high initial strength. The hotmelt adhesive shall further be stable in storage and readily processable and have low emissions, and also display a high rate of cure-through at low temperatures and atmospheric humidities.

We have found that, surprisingly, the problem is solved by a two-stage method comprising a first stage of reacting a polyol with a diisocyanate in a stoichiometric isocyanate excess to form an isocyanate-functional polyurethane prepolymer and a subsequent second stage of reacting a polyester polyol in a large stoichiometric isocyanate excess.

The present invention accordingly provides a two-stage method for producing a polyurethane hotmelt adhesive, which method comprises A) reacting at least one polyol with at least one diisocyanate wherein the NCO/OH ratio is above 1.5 to obtain a reaction mixture containing an isocyanate-functional polyurethane prepolymer and unconverted diisocyanate, and B) reacting the reaction mixture obtained in stage A), containing the isocyanate-functional polyurethane prepolymer and unconverted diisocyanate, with at least one polyester polyol wherein the NCO/OH ratio is above 3.

The method of the present invention provides a hotmelt adhesive composition which by virtue of a suitable choice for the production process (two-stage process) displays a low level of monomeric diisocyanates ("monomers"), e.g., MDI, and thereby offers a higher level of processing safety. Worker protection from harmful diisocyanate vapors is better as a result. The low monomer content makes possible the formulation of R-40 free HMPURs, i.e., HMPURs having a monomer content <1.0 wt %.

The special production process is at the same time responsible for a high degree of regularity resulting in the morphology, making it possible to realize an HMPUR having a high initial strength. Crosslink density and through-cure rate are similarly high for the hotmelt adhesive obtained. The composition of the present invention is also readily processable.

Advantages also result with regard to the method. The production process is simple. Special reactors or reaction conditions are not required by comparison with the conventional, standard methods. Workup is also uncomplicated, additional purifying steps such as, for example, distillative removal of monomeric diisocyanates or selective extraction of monomeric diisocyanates out of the reaction mixture are not required.

Further aspects of the invention are the PU hotmelt adhesive obtainable by the method, the method of using said PU hotmelt adhesive, a method for adhesive bonding with the hotmelt adhesive and also an article obtained by this method. Preferred embodiments are the subject matter of dependent claims.

Ways to Carry Out the Invention

Substance names prefixed "poly", examples being "polyol" or "polyisocyanate", refer to substances which formally contain per molecule two or more of the functional groups occurring in their name. A polyol, for example, is a compound having two or more hydroxyl groups and a polyisocyanate is a compound having two or more isocyanate groups.

A prepolymer is a polymer containing at least one, usually two or more reactive groups, for example isocyanate groups. The prepolymer may be cured, crosslinked or chain extended via the reactive groups.

Starting components herein are the polyols, diisocyanates, polyester polyols and, if used, polyacrylates or polymethacrylates used hereinbelow for producing the polyurethane hotmelt adhesive. This relates particularly to the quantitative particulars adduced hereinbelow.

The average molecular weight herein refers to the number average molecular weight as determined by gel permeation chromatography (GPC) analysis against polystyrene as standard.

The method which the present invention provides for producing a polyurethane hotmelt adhesive comprises a first stage A) of reacting at least one polyol, preferably a polyether polyol, with at least one diisocyanate, especially a monomeric diisocyanate, wherein the NCO/OH ratio is above 1.5 to obtain a reaction mixture containing an isocyanate-functional polyurethane prepolymer and unconverted diisocyanate.

One or more polyols are usable. Suitable polyols include, for example, polyether polyols, polyester polyols, polycarbonate polyols, castor oil and its derivatives or hydroxyl-functional polybutadienes and mixtures thereof, of which polyether polyols, polyester polyols and polycarbonate polyols are preferred. The polyols are preferably diols or triols or mixtures thereof. Particular preference is given to one or more diols, especially one or more polyether diols, one or more polyester diols, one or more polycarbonate diols and mixtures thereof.

The polyol, especially the above-stated preferred polyols, have for example an average molecular weight of at least 400 g/mol, preferably at least 1000 g/mol, e.g., in the range from 400 to 30 000 g/mol, preferably from 1000 to 8000 g/mol.

The polyol is more preferably a polyether polyol. One or more polyether polyols are usable. The polyether polyols are, for example, diols or triols or mixtures thereof. The polyether polyol is more preferably a polyether diol. Polyether polyols are commercially available.

Suitable polyether polyols, also called polyoxyalkylene polyols, include especially those which are polymerization products of ethylene oxide, 1,2-propylene oxide, 1,2-butylene oxide, 2,3-butylene oxide, tetrahydrofuran or mixtures thereof, optionally polymerized with a starter molecule having two or more active hydrogen atoms such as, for example, water, ammonia or compounds having two or more OH or NH groups such as, for example, 1,2-ethanediol, 1,2-propanediol, 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3-cyclohexanedimethanol, 1,4-cyclohexanedimethanol, bisphenol A, hydrogenated bisphenol A, 1,1,1-trimethylolethane, 1,1,1-trimethylolpropane, glycerol, aniline and also mixtures thereof. The polyoxyalkylene polyols used may be not only polyoxyalkylene polyols having a low degree of unsaturation (as measured to ASTM D-2849-69 and reported in milliequivalents of unsaturation per gram of polyol (meq/g)), as prepared for example with so-called double metal cyanide complex catalysts (DMC catalysts), but also polyoxyalkylene polyols having a comparatively high degree of unsaturation, as prepared for example with anionic catalysts such as NaOH, KOH or alkali metal alkoxides.

The polyether polyol is preferably a polyoxyethylene diol, polyoxyethylene triol, polyoxypropylene diol, polyoxypropylene triol or a mixture thereof. The polyether polyol is more preferably a polyethylene oxide and/or a polypropylene oxide. The polyether polyol is most preferably polypropylene oxide. Polyether polyols of this type are commercially available, for example from Bayer under the trade name of Acclaim®. EO-endcapped (ethylene oxide-endcapped) polyoxypropylene diols or triols are likewise suitable. These are polyoxypropylene polyoxyethylene polyols obtained for example by polyoxypropylene polyols on conclusion of the polypropoxylation being alkoxylated with ethylene oxide and thereby displaying primary hydroxyl groups.

The polyether polyol, such as the above-stated preferred polyether polyols, especially polypropylene oxide, have for example an average molecular weight in the range from 400 to 30 000 g/mol, preferably from 1000 to 8000 g/mol and more preferably from 1000 to 4000 g/mol.

Polyester polyols are also useful as polyol for stage A). One or more polyester polyols are usable. Examples of suitable polyester polyols and their advantageous parameters for stage A) are the same as are also usable for stage B). Reference is therefore made to the particulars regarding the polyester polyols for stage B). When a polyester polyol is used for stage A), it may be the same as the polyester polyol used for stage B) or a different polyester polyol.

Preference for use as polyols is also given to one or more polycarbonate polyols. Useful polycarbonate polyols include, for example, polycarbonate polyols obtainable by reacting for example the hereinbelow recited—used for constructing the polyester polyols—di- or trihydric alcohols with dialkyl carbonates, diaryl carbonates or phosgene. Polycarbonate diols, especially amorphous polycarbonate diols, are particularly suitable.

Further suitable polyols include castor oil and its derivatives or hydroxyl-functional polybutadienes, which are for example available under the trade name of "Poly-bd".

The proportion of the at least one polyol, such as the abovementioned preferred polyols, especially polyether polyols, may be for example in a range from 10 to 80 wt %, preferably 20 to 60 wt %, based on the total weight of the starting components.

It is possible to use one or more diisocyanates, especially monomeric diisocyanates. Useful diisocyanates include, for example, aliphatic, cyclo-aliphatic or aromatic diisocyanates, especially monomeric diisocyanates, while aromatic monomeric diisocyanates are preferred. The usual commercially available diisocyanates are usable.

A monomeric di- or polyisocyanate contains more particularly no urethane group. Nonmonomeric diisocyanates include, for example, oligomeric or polymeric products of monomeric diisocyanates, for example adducts of monomeric diisocyanates, which are likewise commercially available. But the use of monomeric diisocyanates is preferred.

Examples of monomeric diisocyanates are 1,6-hexamethylene diisocyanate (HDI), 2-methylpentamethylene 1,5-diisocyanate, 2,2,4- and 2,4,4-trimethyl-1,6-hexamethylene diisocyanate (TMDI) and mixtures of these isomers, 1,10-decamethylene diisocyanate, 1,12-dodecamethylene diisocyanate, lysine diisocyanate, lysine ester diisocyanate, cyclohexane 1,3-diisocyanate and cyclohexane 1,4-diisocyanate and mixtures of these isomers, 1-methyl-2,4-and -2,6-diisocyanatocyclohexane and mixtures of these isomers (HTDI or $H_6$TDI), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}$MDI) and mixtures of these isomers, 1,4-diisocyanato-2,2,6-trimethylcyclohexane (TMCDI), 1,3- and 1,4-bis(isocyanato-methyl)cyclohexane, m- and p-xylylene diisocyanate (m- and p-XDI) and mixtures of these isomers, m- and p-tetramethyl-1,3- and -1,4-xylylene diisocyanate (m- and p-TMXDI) and mixtures of these isomers, bis(1-isocyanato-1-methylethyl)naphthalene, 2,4- and 2,6-tolylene diisocyanate and mixtures of these isomers (TDI), 4,4'-, 2,4'- and 2,2'-diphenylmethane diisocyanate and mixtures of these isomers (MDI), 1,3- and 1,4-phenylene diisocyanate and mixtures of these isomers, 2,3,5,6-tetramethyl-1,4-diisocyanatobenzene, naphthalene 1,5-diisocyanate (NDI), 3,3'-dimethyl-4,4'-diisocyanatobiphenyl (TODI), dianisidine diisocyanate (DADI), and also mixtures thereof.

Preference is given to MDI, TDI, HDI and IPDI. Particular preference is given to diphenylmethane diisocyanate (MDI), especially 4,4'-diphenylmethane diisocyanate (4,4'-MDI). A person skilled in the art knows that the technical grade products of diisocyanates may frequently contain isomer mixtures or other isomers as impurities.

The monomeric diisocyanate has for example a molecular weight of not more than 1000 g/mol, preferably not more than 500 g/mol, more preferably not more than 400 g/mol.

The proportion of the at least one diisocyanate, especially monomeric diisocyanate, may be for example in the range from 5 to 40 wt %, preferably 5 to 20 wt %, based on the total weight of the starting components.

At least one polyester polyol is used as a further starting component in the second stage, stage B). Polyester polyols are for example polyester triols or polyester diols or mixtures thereof. Particular preference is given to using one or more polyester diols.

Suitable polyester polyols are liquid, amorphous or crystalline polyester polyols, such as polyester triols and especially polyester diols, and mixtures of these polyester polyols, where the polyester polyol is preferably a crystalline polyester polyol. The subdivision into liquid, amorphous and crystalline polyester polyols is customary and it is known to a person skilled in the art. Corresponding products are commercially available, for example the Dynacoll® 7000 range from Evonik.

Liquid polyester polyols have a glass transition temperature of below 0° C., preferably −5° C. or below. Amorphous polyester polyols have a glass transition temperature of not less than 0° C. Crystalline polyester polyols have a melting point, the melting point being preferably not less than 35° C., more preferably not less than 50° C. The glass transition temperature (Tg) and the melting point (Smp) may be determined as described in DIN 53765.

Suitable polyester polyols will have been prepared for example from di- or trihydric, preferably dihydric, alcohols, e.g., 1,2-ethanediol, diethylene glycol, triethylene glycol, 1,2-propanediol, 1,3-propanediol, dipropylene glycol, 1,4-butanediol, 1,5-pentanediol, 1,6-hexanediol, 1,8-octanediol, 1,10-decanediol, 1,12-dodecanediol, dimer fatty alcohol, neopentyl glycol, glycerol, 1,1,1-trimethylolpropane or mixtures thereof, with organic dicarboxylic acids or tricarboxylic acids, preferably dicarboxylic acids, or anhydrides or esters thereof, e.g., succinic acid, glutaric acid, 3,3-dimethylglutaric acid, adipic acid, suberic acid, sebacic acid, undecanedioc acid, dodecanedicarboxylic acid, azelaic acid, maleic acid, fumaric acid, phthalic acid, dimer fatty acid, isophthalic acid, terephthalic acid and hexahydrophthalic acid or mixtures thereof, and also polyester polyols from lactones such as, for example, from ε-caprolactone, also called polycaprolactones.

Particularly suitable polyester polyols, especially crystalline polyester polyols, are polyester polyols formed out of adipic acid, sebacic acid or dodecane-dicarboxylic acid as dicarboxylic acid and from hexanediol or neopentyl glycol as dihydric alcohol. Particularly suitable crystalline polyester polyols are adipic acid-hexanediol polyesters and dodecanedicarboxylic acid-hexanediol polyesters.

Further examples of suitable polyester polyols are polyester polyols oleochemical in origin. Polyester polyols of this type are obtainable for example by subjecting epoxidized triglycerides of a fat mixture containing at least some olefinically unsaturated fatty acid to a complete ring-opening reaction with one or more alcohols having 1 to 12 carbon atoms and a subsequent partial transesterification of the triglyceride derivatives to form alkyl ester polyols having 1 to 12 carbon atoms in the alkyl moiety.

The average molecular weight of polyester polyols, such as polyester triols and especially polyester diols, is for example in the range from 1000 to 15 000 g/mol, preferably from 1500 to 8000 g/mol and more preferably from 1700 to 5500 g/mol.

The proportion of the at least one polyester polyol may be for example in a range from 5 to 70 wt %, preferably from 10 to 50 wt %, based on the total weight of the starting components.

In an optional and preferred embodiment, at least one polyacrylate or polymethacrylate may be admixed as a further starting component if desired. One or more polyacrylates and/or one or more polymethacrylates may be used.

The at least one polyacrylate or polymethacrylate, if used, may be admixed at any desired point in time, for example in or after stage A) and/or in or after stage B). When the at least one polyacrylate or polymethacrylate is used, the reaction of the at least one polyol with the at least one diisocyanate in stage A) is preferably carried out in the presence of the at least one polyacrylate or polymethacrylate. For this, it is preferable for the at least one polyol to be mixed with the at least one polyacrylate or polymethacrylate and for the at least one diisocyanate to be added to the mixture obtained.

Polyacrylates and polymethacrylates are commercially available. A comprehensive review of polyacrylates and polymethacrylates is found for example in Ullmanns Encyklopädie der technischen Chemie, Verlag Chemie, 4th edition, volume 19, pages 7-30.

The polyacrylate or polymethacrylate is a homopolymer or copolymer of at least one acrylic ester and/or at least one methacrylic ester and optionally further comonomers. A copolymer of acrylic ester is referred to as polyacrylate even when it includes a methacrylic ester as comonomer. The polyacrylate or polymethacrylate is preferably a bead polymer.

Acrylic esters and methacrylic esters are, for example, $C_{1-12}$alkyl acrylate, preferably $C_{1-4}$alkyl acrylate, and respectively $C_{1-12}$alkyl methacrylate, preferably $C_{1-4}$alkyl methacrylate. Acrylic esters or methacrylic esters without an additional functional group are preferable. If desired, however, the acrylic esters and methacrylic esters may also have an additional functional group such as a carboxyl group or hydroxyl group. But these are generally, if used at all, used together with at least one acrylic ester or methacrylic ester without an additional functional group.

Examples of acrylic esters and methacrylic esters are methyl acrylate, ethyl acrylate, n-butyl acrylate, tert-butyl acrylate, isobutyl acrylate, 2-ethylhexyl acrylate, lauryl acrylate, methyl methacrylate, ethyl methacrylate and n-butyl methacrylate. Examples of acrylic esters or methacrylic esters having an additional functional group are maleic acid, 2-hydroxyethyl acrylate, 2-hydroxy-ethyl methacrylate, hydroxypropyl acrylate, propylene glycol methacrylate, butanediol monoacrylate and butanediol monomethacrylate.

Examples of optionally used further comonomers are styrene, acrylonitrile, vinyl acetate, vinyl propionate and vinyl chloride. Further optional comonomers, if used, are frequently used as auxiliary monomers, i.e., in relatively low amounts, are acrylic acid, methacrylic acid, itaconic acid, maleic acid, fumaric acid, crotonic acid or amides thereof.

Preferred polyacrylates or polymethacrylates are copolymers obtained by free-radical polymerization of one or more acrylic esters and/or methacrylic esters alone or combined with one or more OH-functional acrylic esters and/or OH-functional methacrylic esters.

The polyacrylate or polymethacrylate is preferably a homopolymer or copolymer of at least one acrylic ester, methacrylic ester, hydroxyl-functional acrylic ester, hydroxyl-functional methacrylic ester or a combination thereof and also optionally at least one further comonomer, although preferably at least one acrylic ester or methacrylic ester does not have an additional functional group.

The polyacrylate or polymethacrylate is more preferably a copolymer of methyl methacrylate and n-butyl methacrylate and optionally at least one further comonomer, for example a hydroxyl-functional acrylic ester or a hydroxyl-functional methacrylic ester.

Suitable polyacrylates or polymethacrylates are available, for example from Evonik under the product range name of Dynacoll® AC.

The average molecular weight of the polyacrylate or polymethacrylate is for example in the range from 10 000 to 200 000 g/mol, preferably from 20 000 to 150 000 g/mol.

The proportion of the at least one polyacrylate or polymethacrylate may be for example in the range from 0 to 50 wt % or from 1 to 50 wt %, preferably from 5 to 40 wt %, based on the total weight of the starting components.

The first stage, stage A), comprises reacting the at least one polyol, preferably polyether polyol, and the at least one diisocyanate in an NCO/OH ratio of above 1.5. The NCO/OH ratio is the molar ratio of isocyanate groups to hydroxyl groups in the starting components used in stage A), i.e., especially the polyether polyols and diisocyanates. When the reaction is carried out in the presence of the at least one polyacrylate or polymethacrylate and these likewise have hydroxyl groups capable of reacting with isocyanate groups, these are taken into account for the NCO/OH ratio.

The NCO/OH ratio in stage A) is preferably not less than 1.7, more preferably not less than 1.9 and yet more preferably not less than 1.95 while preferably not being greater than 2.5 and more preferably not greater than 2.2. The NCO/OH ratio in stage A) is preferably in the range from above 1.5 to 2.5, more preferably from 1.7 to 2.2.

The stage A) reaction of polyol and diisocyanate may take place in the presence of the polyacrylate or polymethacrylate in a preferred embodiment, for example by mixing polyol with the polyacrylate or polymethacrylate and then adding the diisocyanate to the mixture. In a preferred embodiment, the polyol is dissolved in the polyacrylate or polymethacrylate, if necessary by heating, and then the diisocyanate is added to the mixture.

The reaction of polyol and diisocyanate in stage A) may be carried out according to generally customary, conventional methods of producing isocyanate-functional polyurethane prepolymers.

The reaction of the at least one polyol with the at least one diisocyanate, preferably monomeric diisocyanate, may for example be carried out at temperatures in the range from 60 to 160° C., preferably from 80 to 140° C. The reaction time, as will be appreciated, depends on the temperature employed, but may be for example in the range from 30 min to 6 h, preferably in the range from 30 min to 3 h and more preferably in the range from 1 to 1.5 h.

The reaction of polyols and diisocyanates may optionally be carried out in the presence of customary metal catalysts, for example bismuth catalysts, such as Coscat® 83 from Vertellus Performance Materials Inc., or tin catalysts.

A reaction mixture containing an isocyanate-functional polyurethane prepolymer is obtained from the reaction. The reaction mixture will, where applicable, further contain the at least one polyacrylate or polymethacrylate, which generally does not take part in the reaction. When the polyacrylate or polymethacrylate has hydroxyl groups as additional functional groups, these may be the source of reactions with the diisocyanate. The reaction will convert substantially all the hydroxyl groups of the polyol, for example not less than 95% and generally not less than 99% of the hydroxyl groups of the polyol. The reaction mixture further contains unconverted diisocyanate, especially monomeric diisocyanate. The reaction product generally has an unconverted diisocyanate, especially monomeric diisocyanate, content of, for example, 1.5 to 5 wt %, especially about 2 to 4 wt %, based on the total weight of the reaction mixture. The level of unconverted diisocyanates remaining in the reaction mixture can be determined using HPLC (detection via photodiode array).

The isocyanate-functional polyurethane prepolymer in the reaction mixture may for example have an average isocyanate functionality in the range from 1.8 to 2.2.

Stage B) comprises reacting the reaction mixture obtained in stage A), containing the isocyanate-functional polyurethane prepolymer and unconverted diisocyanate, with at least one polyester polyol wherein the NCO/OH ratio is above 3. The reaction mixture obtained in stage A) is usable for stage B) as such, i.e., without workup. More particularly, unconverted diisocyanate is not separated off from the reaction mixture. Apart from the unconverted diisocyanate present in the reaction mixture, furthermore, especially no additional diisocyanate is added. The two-stage method may preferably be performed as a one-pot process.

The NCO/OH ratio in stage B) is the molar ratio of isocyanate groups to hydroxyl groups based on the reaction mixture and the added polyester polyol. The level of isocyanate groups in the reaction mixture corresponds to the theoretical NCO content of the prepolymer from stage A). The theoretical NCO content computes in the usual manner from the amounts of polyether polyol and diisocyanate which are used in stage A) on the assumption of a theoretically complete reaction. OH groups capable of reacting with isocyanate groups are essentially no longer present in the reaction mixture obtained from stage A).

The NCO/OH ratio in stage B) is above 3. The NCO/OH ratio in stage B) is for example in the range from above 3 to 20 and preferably in the range from above 3 to 10.

The reaction of the polyester polyol with the reaction mixture is carried out in a conventional manner. This means in particular that the hydroxyl groups of the polyester polyol react with the isocyanate groups in the reaction mixture, especially with isocyanate groups of unconverted diisocyanates and isocyanate groups of the isocyanate-functional polyurethane prepolymer present in the reaction mixture.

The reaction of the at least one polyester polyol with the reaction mixture containing the isocyanate-functional polyurethane prepolymer and unconverted diisocyanate may for example be carried out at temperatures in the range from 60 to 160° C., preferably from 80 to 140° C. The reaction time, as will be appreciated, depends on the temperature employed, but may for example range from 30 min to 6 h, preferably from 30 min to 3 h and more preferably from 1 to 1.5 h.

The two-stage method of the present invention gives a polyurethane hotmelt adhesive. The method may optionally comprise the step of admixing one or more assistants of the type customary for such hotmelt adhesives. The assistants may be admixed at any desired point in time, for example in or after stage A) and/or in or after stage B). It is generally advantageous to add the optional assistant(s) at an elevated temperature in order that a homogeneous mixture may be obtained, for example at a temperature of not less than 60° C., preferably not less than 100° C. and more preferably not less than 110° C.

Optional assistants, if used at all, preferably comprise not more than 60 wt %, preferably not more than 50 wt %, based on the total weight of the polyurethane hotmelt adhesive.

Examples of suitable optional assistants are one or more thermoplastic polymers and/or one or more additives. The additives are selected for example from fillers, catalysts, plasticizers, adhesion promoters, UV absorbers, UV stabilizers, heat stabilizers, antioxidants, flame retardants, optical brighteners, pigments, dyes and driers. Examples of catalysts are catalysts that catalyze the reaction of isocyanate groups with atmospheric humidity.

The optional thermoplastic polymers are preferably non-reactive thermoplastic polymers. Examples are homo- or copolymers of unsaturated monomers, especially from the group comprising ethylene, propylene, butylene, isobutylene, isoprene, vinyl acetate and/or higher esters thereof. Ethylene-vinyl acetate copolymer (EVA), atactic poly-α-olefin (APAO), polypropylene (PP) and polyethylene (PE) are particularly suitable.

The method of the invention gives a polyurethane hotmelt adhesive comprising an isocyanate-functional, especially an isocyanate-terminated, polyurethane polymer and/or polyurethane prepolymer. The polyurethane hotmelt adhesive is more particularly a moisture-curing polyurethane hotmelt adhesive, i.e., the hotmelt adhesive is curable by admixture of water, especially atmospheric humidity. A reactive polyurethane hotmelt adhesive is thus concerned.

The polyurethane hotmelt adhesive preferably has a monomeric diisocyanate content of not more than 1.0 wt %, preferably not more than 0.9 wt % and more preferably not more than 0.8 wt %, based on the total weight of the hotmelt adhesive.

The polyurethane hotmelt adhesive of the invention is meltable, i.e., its viscosity at application temperature is sufficiently low to enable suitable application, and its solidification on cooling is rapid, so it is rapidly able to absorb forces even before the crosslinking reaction with atmospheric humidity is complete.

The polyurethane hotmelt adhesive of the invention is especially useful as a storage- and processing-stable HMPUR that does not require obligatory R-40 labeling.

An illustrative schematic example will now be more particularly described to bring out the differences between a one-stage and a two-stage method. Specific indications provided therein, for example in respect of starting components and NCO/OH ratios, are merely for better illustration and should not be construed as limiting in any way the scope of the invention in this regard.

In a conventional one-stage method for producing a hotmelt adhesive based on a reactive polyurethane composition (HMPUR), the reaction of the polyols and polyisocyanates takes place in one stage. When diisocyanates having isocyanate groups of substantially equal reactivity are reacted with hydroxyl-containing compounds, the remaining level of monomeric diisocyanate in the reaction product will depend on the NCO/OH ratio of the reactants in the prepolymer synthesis. With an NCO/OH ratio of, for example, 2, as is frequently advantageous for the prepolymer composition, about 25% of the monomeric diisocyanate used survives as a monomer into the prepolymer. That is, a starting amount of about 10-12 wt % of diisocyanate will result, in agreement with the Schulz-Flory statistics, in about 2 to 3 wt % of monomeric diisocyanate such as MDI in the prepolymer.

The two-stage process provided by the invention for producing a hotmelt adhesive based on a reactive polyurethane composition (HMPUR) having a low level of monomeric diisocyanate (MDI) will leave in the first step, as with the one-stage method, about 25% of the starting monomeric diisocyanate as a monomer in the prepolymer. This reactive prepolymer having an NCO content of, for example, about 2 to 4 wt % is then made to react in a second step with polyester polyols at an NCO/OH ratio of above 3. A suitable choice for the NCO/OH ratio thus makes it possible to realize a reactive polyurethane composition (HMPUR) having a low level of monomeric diisocyanate such as MDI.

This stagewise form of reaction management will at the same time introduce a certain degree of regularity in the construction of the prepolymer in the form of polyester- and polyol-rich, especially polyether-rich, domains. As a result, this reactive polyurethane adhesive (HMPUR) will surprisingly have in addition a distinctly higher initial strength than an HMPUR obtained by the above-described one-stage method employing the same starting components.

The invention further comprises a method for adhesively bonding a first substrate to a second substrate, which method comprises the step of heating a polyurethane hotmelt adhesive according to the invention; the step of applying heated polyurethane hotmelt adhesive to the first substrate; the step of contacting the applied polyurethane hotmelt adhesive with the second substrate; and the step of chemically curing the polyurethane hotmelt adhesive with water, especially atmospheric humidity.

The step of heating the hotmelt adhesive can be for example to a temperature in the range from 80° C. to 200° C., especially from 120° C. to 160° C.

The first substrate and the second substrate may be of the same or of differing material.

A person skilled in the art will appreciate that depending on the system used, the temperature and the reactivity of the adhesive, crosslinking reactions and hence the chemical cure may commence even during application. However, the main proportion of crosslinking and hence the chemical cure in a narrower sense usually take place after application.

The first and/or second substrate may if desired be pretreated before application of the hotmelt adhesive. Pretreatments of this type include especially physical and/or chemical methods of cleaning and activation, examples being sanding, sandblasting, brushing, corona treatment, plasma treatment, flame treatment, surface etching or the like, or treating with cleaners or solvents or applying an adhesion promoter, an adhesion promoter solution or a primer.

The first and second substrate or surface thereof may be for example of plastic, organic material such as leather, fabric, paper, wood, resin-bonded wood-base engineering material, resin-textile composite engineering material, glass, porcelain, ceramics and also metal and metal alloy, especially painted or powder-coated metal and metal alloy.

Suitable plastics include especially polyvinyl chloride (PVC), acrylonitrile-butadiene-styrene copolymers (ABS), SMC (sheet molding composites), polycarbonate (PC), polyamide (PA), polyesters (PE), polyoxymethylene (POM), polyolefin (PO), especially polyethylene (PE) or polypropylene (PP), preferably plasma-, corona- or flame-surface treated PP or PE.

The first and second substrates are preferably either or both a plastics sheeting, a textile or glass. Preferred materials for the first and/or second substrates are transparent materials, especially transparent plastics sheetings. Another preferred transparent material is glass, especially in the form of a pane.

The polyurethane hotmelt adhesive of the present invention is especially suitable for industrial applications, for example in vehicle construction, especially in automotive construction, the textile industry, for example as textile adhesive, and the packaging industry, for example as a film adhesive.

The polyurethane hotmelt adhesive of the present invention is especially suitable for adhesive bonds where the joint is visible. It is thus especially suitable for the adhesive bonding of glass, especially in vehicle and window construction, and for the adhesive bonding of transparent packaging.

The thickness of the adhesive layer formed out of the polyurethane hotmelt adhesive of the present invention is, for example, 10 µm or more, preferably the thickness is in the range from 10 to 1000 µm, more preferably from 80 to 500 µm.

The invention also provides articles adhesively bonded by the adhesive bonding method of the present invention. Articles of this type are especially articles of the transportation industry, especially of the automotive industry, furniture industry or textile industry.

Examples of adhesively bonded articles are automotive interior trim parts, such as roof liner, sun visor, instrument panel, door side part, parcel shelf and the like; wood fiber engineering materials in the bath and shower sector; decorative furniture foils, membrane films with textiles such as cotton, polyester films in the apparel sector or textiles with foams for automotive trim. Further examples of adhesively bonded articles are articles from the packaging industry, especially a see through pack.

Examples follow for further elucidation of the invention, but which are not intended to limit the subject matter of the invention in any way.

EXAMPLES

Unless otherwise indicated, amounts are by weight. The following substances were used in the examples:

| | | |
|---|---|---|
| Diisocyanate | 4,4'-Diphenylmethane diisocyanate (MDI) | Bayer |
| polyether polyol | linear polypropylene ether polyol, average molecular weight = 2000 g/mol | Bayer |
| polymethacrylate A | Dynacoll AC type1* | Evonik |
| polymethacrylate B | Dynacoll AC type2* | Evonik |
| polymethacrylate C | Dynacoll AC type3* | Evonik |
| polyester polyol | crystalline polyester polyol, average molecular weight = 3500 g/mol | Evonik |

*average molecular weight in the range from 20 000 to 150 000 g/mol, copolymer comprising methyl methacrylate and n-butyl methacrylate.

Methods of Measurement

The moisture-curing hotmelt adhesives obtained were characterized using the following methods of measurement:

Viscosity

Viscosity was measured at 130° C. using a rheomat (Brookfield, Thermosel, spindle 27, shear rate 1 $min^{-1}$).

Open Time

The hotmelt adhesive was preheated at 140° C. for 30 min. During that period, a bar applicator was placed on a strip (about 30 cm in length) of Sicol paper. Both were then placed on a hotplate and preheated. No fewer than 20 test strips of Sicol paper (10 cm×1 cm) were readied. Once everything was up to temperature, about 20 g of the adhesive were introduced into the bar applicator and used to form a film of about 30 cm. The paper was then immediately removed from the hotplate and placed on a plywood, preferably beech, panel which had been conditioned to room temperature (23° C.). The stopwatch was started at this point in time. Every 10 s a narrow strip of paper was pressed (finger pressure slight) down on the adhesive and gradually removed again in order to separate the two strips of paper. Once the fracture mode changed from cohesive to partly adhesive, the open time is at an end. This point in time is recorded in s or min.

Initial Strength

The initial strength of the hotmelt adhesive was tested with a lap shear wood specimen. The standard wood is beech (*Fagus sylvatica*) (specimen: 2 pieces: 100 mm×25 mm×5 mm, thickness of adhesive layer: 1 mm). The initial strength was measured 6, 10, 20 and 30 min after assembly of the specimens. The force at fracture of the specimen was determined at a defined testing speed. Standard conditions: 23° C./50% relative humidity, traverse speed: 10 mm/min.

The shear strength of the overlap butt T [MPa] was then determined as per: T=Fmax/A, where Fmax=maximum force and A=bond area Residual Monomer The level of unconverted diisocyanate remaining in the hotmelt adhesive was determined using HPLC (detection via photodiode array) and is reported in wt % based on the entire hotmelt adhesive tested.

Through-cure

The through-cure rate of the hotmelt adhesive tested was tested on a 500 μm film of adhesive. For this purpose, the adhesive was preheated at 140° C. for 30 min. A piece of Sicol paper (B700 white, about 6 cm wide and about 60 cm long, Laufenberg & Sohn KG) and a bar applicator were preheated on a hotplate at 150° C. 20 g of the preheated adhesive are introduced into the bar applicator and a 500 μm film of the adhesive is applied in a length of about 60 cm to the Sicol paper present on the hotplate. The paper is then removed from the plate. Once the adhesive has solidified (start point), the film is stored in a conditioning chamber (23° C., 55% relative humidity). At defined time intervals, a narrow strip of 10 cm×1 cm is cut out of the film and placed on a hotplate at 150° C. This is repeated until the strip on the hotplate ceases to melt, which indicates that the adhesive has cured through. The time interval from the start point to the time interval in which the removed strip ceases to melt is the time needed (in hours) for the through-cure.

Tensile Strength and Elongation at Break

Proceeding in accordance with DIN 53504, five rectangular specimens measuring 2.5×10 cm in size were cut out of a 500 μm thick cured film (cured for 7 days at 23° C./50% rh) of the sample and clamped into a tensile tester (Zwick Z 020) and pulled apart at a speed of 100 mm/min (test condition 23° C./50% rh). What was measured was the maximum tensile force absorbed by the sample. It was used to determine tensile strength and elongation at break, each being averaged for the five specimens.

EXPERIMENTS

Polyurethane hotmelt adhesives were produced according to a conventional single-stage method (reference example) and the two-stage method of the invention (example) in accordance with the following experimental descriptions. The exemplified components and their proportions are shown in table 1. The hotmelt adhesives obtained were tested using the abovementioned methods of measurement. The results are shown in table 2.

TABLE 1

|  | Ref. Ex. (1-stage) | Ex. (2-stage) |
| --- | --- | --- |
| polyether polyol [wt %] | 37.2 | 38.3 |
| polymethacrylate A [wt %] | 8.8 | 9.0 |
| polymethacrylate B [wt %] | 15.3 | 15.8 |
| polymethacrylate C [wt %] | 4.4 | 4.5 |
| polyester polyol [wt %] | 21.9 | 22.2 |
| diisocyanate MDI [wt %] | 12.5 | 10.1 |

TABLE 2

|  | Ref. Ex. (1-stage) | Ex. (2-stage) |
| --- | --- | --- |
| viscosity at 130° C. [mPa*s] | 15 000 | 23 000 |
| open time [min] | 2-3 | 1 |
| initial strength 6 min [MPa] | 0.02 | 0.14 |
| initial strength 10 min [MPa] | 0.04 | 0.40 |
| initial strength 20 min [MPa] | 0.21 | 0.63 |
| initial strength 30 min [MPa] | 0.33 | 0.61 |
| through-cure time [h] | <22 | <22 |
| strength [MPa] | 9.0 | 10.0 |
| elongation at break [%] | 600 | 660 |
| residual monomer MDI [wt %] | 2.7 | 0.8 |

Reference Example (Single-Stage Method)

A 1 liter reaction vessel with nonstick coating and a 4 neck ground glass joint lid 25 was initially charged with a polyether-polyacrylate mixture in the amounts reported in table 1. This was followed by mixing in a temperature controlled oil bath at 160° C. for 2 hours. The liquid polyol mixture thus obtained was mixed with polyester polyol and the mixture was dehydrated at 140° C. for an hour by stirring in a high vacuum. Then, MDI was added to the polyol in the reaction vessel in a molar ratio of NCO/OH=2:1 and the mixture was reacted for 1 hour at maintained temperature (140° C.) with stirring. The reaction product formed was stored at room temperature under exclusion of moisture.

Example (Two-stage Method)

A 1 liter reaction vessel with nonstick coating and a 4 neck ground glass joint lid 25 was initially charged with a polyether-polyacrylate mixture in the amounts reported in table 1. This was followed by mixing in a temperature controlled oil bath at 160° C. for 2 hours. Then, MDI was added to the polyol-polyacrylate mixture in the reaction vessel in a molar ratio of NCO/OH =2:1 and the mixture was reacted for 1 hour at maintained temperature (140° C.) with stirring. The molten and dehydrated polyester polyol was added to this prepolymer at 140° C. and the mixture was reacted at maintained temperature for 1 hour with stirring. The reaction product formed was stored at room temperature under exclusion of moisture.

What is claimed is:

1. A two-stage method for producing a polyurethane hotmelt adhesive, which method comprises
   A) reacting at least one polyol with at least one diisocyanate wherein the NCO/OH ratio is in a range of from above 1.5 to 2.2 to obtain a reaction mixture containing an isocyanate-functional polyurethane prepolymer and unconverted diisocyanate, wherein the unconverted diisocyanate content of the reaction mixture obtained in stage A) is from 1.5 to 5 wt %, based on the total weight of the reaction mixture, and B) reacting the reaction mixture obtained in stage A), containing the isocyanate-functional polyurethane prepolymer and unconverted diisocyanate, with at least one polyester polyol wherein the NCO/OH ratio is above 3; wherein at least one polyacrylate or polymethacrylate is admixed.

2. The method as claimed in claim 1, wherein the NCO/OH ratio in stage B) is in the range from above 3 to 20.

3. The method as claimed in claim 1, wherein the polyol is a polyether polyol, a polyester polyol, a polycarbonate polyol, castor oil, a castor oil derivative, a hydroxyl-functional polybutadiene or a mixture of two or more thereof.

4. The method as claimed in claim 1, wherein the polyol is a polypropylene oxide or an EO-capped polypropylene oxide.

5. The method as claimed in claim 1, wherein the diisocyanate is a monomeric diisocyanate.

6. The method as claimed in claim 1, wherein the polyester polyol is a liquid, amorphous or crystalline polyester polyol.

7. The method as claimed in claim 1, wherein the polyacrylate or polymethacrylate is a homopolymer or copolymer of at least one acrylic ester, methacrylic ester, hydroxyl-functional acrylic ester or hydroxyl-functional methacrylic ester or a combination thereof and optionally also at least one further comonomer.

8. The method as claimed in claim 1, wherein stage A) further comprises dissolving the polyol in the polyacrylate or polymethacrylate and then adding the diisocyanate to the mixture.

9. The method as claimed in claim 1, wherein the reaction in stage A) is carried out at a temperature in a range of 60° C. to 160° C. and/or the reaction in stage B) is carried out at a temperature in a range of 60° C. to 160° C.

10. The method as claimed in claim 1, wherein one or more thermoplastic polymers and/or one or more additives are further admixed in or after stage A) and/or in or after stage B).

11. The method as claimed in claim 1, wherein the unconverted diisocyanate content of the reaction mixture obtained in stage A) is from 2 to 4 wt %, based on the total weight of the reaction mixture.

* * * * *